(12) United States Patent
Kiyozuka

(10) Patent No.: US 8,496,183 B2
(45) Date of Patent: Jul. 30, 2013

(54) NON-CONTACT IC CARD COMMUNICATION CONTROLLER AND NON-CONTACT IC CARD HOLDER

(75) Inventor: Toru Kiyozuka, Shibukawa (JP)

(73) Assignee: Taiyo, Inc. (JP)

( * ) Notice: Subject to any disclaimer, the term of this patent is extended or adjusted under 35 U.S.C. 154(b) by 79 days.

(21) Appl. No.: 12/600,593

(22) PCT Filed: Feb. 6, 2009

(86) PCT No.: PCT/JP2009/000459
§ 371 (c)(1),
(2), (4) Date: Apr. 16, 2010

(87) PCT Pub. No.: WO2009/098890
PCT Pub. Date: Aug. 13, 2009

(65) Prior Publication Data
US 2010/0230309 A1    Sep. 16, 2010

(30) Foreign Application Priority Data

Feb. 6, 2008 (JP) ................... 2008-026773

(51) Int. Cl.
*G08B 13/14* (2006.01)
(52) U.S. Cl.
USPC ............. 235/492; 340/572.1; 340/572.3
(58) Field of Classification Search
USPC .................. 235/492; 340/572.1–572.9
See application file for complete search history.

(56) References Cited

U.S. PATENT DOCUMENTS

| | | | |
|---|---|---|---|
| 6,343,744 B1 * | 2/2002 | Shibata et al. | 235/492 |
| 6,465,880 B1 * | 10/2002 | Dobashi et al. | 257/679 |
| 6,830,193 B2 * | 12/2004 | Tanaka | 235/492 |
| 2006/0187055 A1 * | 8/2006 | Colby | 340/572.7 |
| 2009/0026277 A1 * | 1/2009 | Phillips | 235/495 |
| 2010/0035539 A1 * | 2/2010 | Yoshida et al. | 455/1 |

FOREIGN PATENT DOCUMENTS

| | | |
|---|---|---|
| EP | 1 852 808 A1 | 11/2007 |
| FR | 2 863 748 A1 | 6/2005 |

(Continued)

OTHER PUBLICATIONS

International Preliminary Report on Patentability, issued Sep. 7, 2010; Translation of Written Opinion of the International Searching Authority; and Notification of Transmittal of the Translation of the International Preliminary Report on Patentability for corresponding International Application No. PCT/JP2009/000459 filed Feb. 6, 2009.
English language translation of abstract of Publication No. WO2006006211 (A1) Jan. 19, 2006.
Extended European Search Report dated Mar. 2, 2011 for corresponding Application No. EP 09 708 056.8.
English language translation of abstract of FR2863748, Jun. 2005.
English language translation of abstract of JP2004348500, Dec. 2004.

*Primary Examiner* — Thien M Le
*Assistant Examiner* — Christopher Stanford
(74) *Attorney, Agent, or Firm* — Husch Blackwell LLP

(57) ABSTRACT

Provided is a non-contact IC card communication controller of a simple configuration which can easily be manufactured at a reasonable cost. The non-contact IC card communication controller (100) includes: a copper plate frame (101) having a cut-off portion (20); and a copper plate piece (30a) which arbitrarily closes the cut-off portion (20). When the controller (100) is arranged so as to be overlapped with a non-contact IC card, the copper plate frame (101) and a coil antenna built in the non-contact IC card are partially or entirely overlapped. If the cut-off portion (20) is in the open state, it is possible to read information recorded on the non-contact IC card. If the cut-off portion (20) is in the closed state, it is impossible to read the information recorded on the non-contact IC card.

6 Claims, 15 Drawing Sheets

FOREIGN PATENT DOCUMENTS

| | | |
|---|---|---|
| JP | 2000-306066 | 11/2000 |
| JP | 2004-348500 | 12/2004 |
| JP | 2007-012012 | 1/2007 |
| JP | 2007-199888 | 8/2007 |
| JP | 2007-220016 | 8/2007 |
| JP | 3836496 | 10/2009 |
| WO | 2006/006211 | 1/2006 |
| WO | WO 2006/006211 A1 | 1/2006 |

* cited by examiner

Fig. 5A
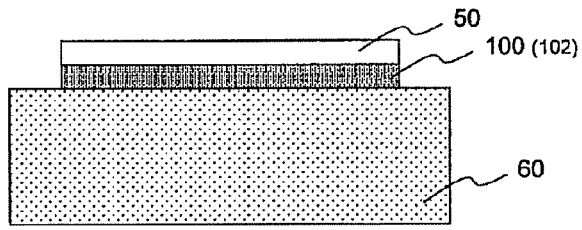
Fig. 5B
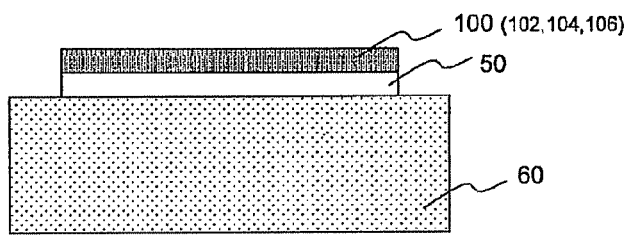
Fig. 6
PLACEMENT ORDER: READER – COPPER PLATE – NON-CONTACT IC CARD
| FRAME WIDTH (mm) | Suica™, ICOCA™ MAGNETIC FIELD STRENGTH | | QUICPay™ MAGNETIC FIELD STRENGTH | |
| --- | --- | --- | --- | --- |
|  | 7.5A/m | 10A/m | 7.5A/m | 10A/m |
| 3 | × | × | × | × |
| 4 | × | × | × | × |
| 5 | × | × | × | × |
| 6 | × | × | ○ | × |
| 7 | × | × | ○ | ○ |
| 8 | × | × | ○ | ○ |
| 9 | ○ | × | ○ | ○ |
| 10 | ○ | × | ○ | ○ |
| 11 | ○ | ○ | ○ | ○ |
| 12 | ○ | ○ | ○ | ○ |
| 13 | ○ | ○ | ○ | ○ |
| 14 | ○ | ○ | ○ | ○ |
| 15 | ○ | ○ | ○ | ○ |
| 16 | ○ | ○ | ○ | ○ |
○... NON-CONTACT IC CARD ACTIVATION PREVENTED (COMMUNICATION DISABLED)
×... NON-CONTACT IC CARD ACTIVATED (COMMUNICATION ENABLED)

PLACEMENT ORDER: READER – NON-CONTACT IC CARD – COPPER PLATE

| FRAME WIDTH (mm) | Suica™, ICOCA™ MAGNETIC FIELD STRENGTH | | QUICPay™ MAGNETIC FIELD STRENGTH | |
|---|---|---|---|---|
| | 7.5A/m | 10A/m | 7.5A/m | 10A/m |
| 3 | × | × | × | × |
| 4 | × | × | × | × |
| 5 | × | × | × | × |
| 6 | × | × | ○ | × |
| 7 | × | × | ○ | ○ |
| 8 | × | × | ○ | ○ |
| 9 | × | × | ○ | ○ |
| 10 | ○ | × | ○ | ○ |
| 11 | ○ | × | ○ | ○ |
| 12 | ○ | × | ○ | ○ |
| 13 | ○ | ○ | ○ | ○ |
| 14 | ○ | ○ | ○ | ○ |
| 15 | ○ | ○ | ○ | ○ |
| 16 | ○ | ○ | ○ | ○ |

○... NON-CONTACT IC CARD ACTIVATION PREVENTED (COMMUNICATION DISABLED)

×... NON-CONTACT IC CARD ACTIVATED (COMMUNICATION ENABLED)

(Type A)

(Type B)

※ MAGNETIC FIELD STRENGTH : 7.5A/m

|  | TYPE A | TYPE B | TYPE C | |
|---|---|---|---|---|
|  |  |  | RC-S880 FIRST TYPE | RC-S853 SECOND TYPE |
| (a) SAME WIDTH AS ANTENNA COIL | × | ○ | ○ | ○ |
| (b) 0.5mm OFFSET | ○ | ○ | ○ | ○ |
| (c) 1mm OFFSET | ○ | ○ | ○ | ○ |

○···NON-CONTACT IC CARD ACTIVATION PREVENTED (COMMUNICATION DISABLED)

×···NON-CONTACT IC CARD ACTIVATED (COMMUNICATION ENABLED)

Fig. 14

TYPE A
※MAGNETIC FIELD STRENGTH 7.5A/m

| WIDTH (mm) | COMMUNICABLE DISTANCE (mm) | COMMUNICATION SUCCESS RATE (%) |
|---|---|---|
| (CARD ONLY) | 76 | |
| 10 | 70 | 92 |
| 11 | 67 | 88 |
| 12 | 63 | 83 |
| 13 | 63 | 83 |
| 14 | 60 | 79 |
| 15 | 56 | 74 |
| 16 | 54 | 71 |
| 17 | 51 | 67 |
| 18 | 49 | 64 |
| 19 | 46 | 61 |
| 20 | 42 | 55 |
| 21 | 41 | 54 |
| 22 | 36 | 47 |
| 23 | 34 | 45 |
| 24 | 30 | 39 |
| 25 | 25 | 33 |

TYPE B
※MAGNETIC FIELD STRENGTH 7.5A/m

| WIDTH (mm) | COMMUNICABLE DISTANCE (mm) | COMMUNICATION SUCCESS RATE (%) |
|---|---|---|
| (CARD ONLY) | 53 | |
| 10 | 52 | 98 |
| 11 | 50 | 94 |
| 12 | 50 | 94 |
| 13 | 49 | 92 |
| 14 | 46 | 87 |
| 15 | 44 | 83 |
| 16 | 43 | 81 |
| 17 | 40 | 75 |
| 18 | 38 | 72 |
| 19 | 36 | 68 |
| 20 | 34 | 64 |
| 21 | 30 | 57 |
| 22 | 28 | 53 |
| 23 | 24 | 45 |
| 24 | 21 | 40 |
| 25 | 19 | 36 |

TYPE C (RS-C880)
※MAGNETIC FIELD STRENGTH 7.5A/m

| WIDTH (mm) | COMMUNICABLE DISTANCE (mm) | COMMUNICATION SUCCESS RATE (%) |
|---|---|---|
| (CARD ONLY) | 72 | |
| 10 | 69 | 96 |
| 11 | 69 | 96 |
| 12 | 67 | 93 |
| 13 | 62 | 86 |
| 14 | 60 | 83 |
| 15 | 55 | 76 |
| 16 | 52 | 72 |
| 17 | 50 | 69 |
| 18 | 49 | 68 |
| 19 | 46 | 64 |
| 20 | 42 | 58 |
| 21 | 41 | 57 |
| 22 | 38 | 53 |
| 23 | 34 | 47 |
| 24 | 30 | 42 |
| 25 | 29 | 40 |

TYPE C (RS-C854)
※MAGNETIC FIELD STRENGTH 7.5A/m

| WIDTH (mm) | COMMUNICABLE DISTANCE (mm) | COMMUNICATION SUCCESS RATE (%) |
|---|---|---|
| (CARD ONLY) | 65 | |
| 10 | 64 | 98 |
| 11 | 61 | 94 |
| 12 | 60 | 92 |
| 13 | 57 | 88 |
| 14 | 52 | 80 |
| 15 | 51 | 78 |
| 16 | 50 | 77 |
| 17 | 47 | 72 |
| 18 | 44 | 68 |
| 19 | 42 | 65 |
| 20 | 40 | 62 |
| 21 | 36 | 55 |
| 22 | 31 | 48 |
| 23 | 30 | 46 |
| 24 | 23 | 35 |
| 25 | 20 | 31 |

NON-CONTACT IC CARD COMMUNICATION CONTROLLER AND NON-CONTACT IC CARD HOLDER

TECHNICAL FIELD

The present invention relates to a non-contact IC card communication controller and a non-contact IC card holder, and more specifically relates to a non-contact IC card communication controller and a non-contact IC card holder that allow the bearer to arbitrarily enable or disable communication between a non-contact IC card and a card reader.

BACKGROUND ART

In recent years, non-contact IC card techniques are used in various aspects of daily life, such as prepaid cards and public transportation tickets.

FIGS. 18(a) and 18(b) schematically show a non-contact IC card and a card reader. As shown in the drawing, when the user holds a non-contact IC card 50 over a card reader 60, a magnetic field A is generated from the card reader 60 to the non-contact IC card 50. This magnetic field A is converted to an electric current when passing through a coil built in the non-contact IC card 50, and used as power for an IC. A magnetic field B whose direction is opposite to that of the magnetic field generated from the card reader 60 is then generated in the non-contact IC card 50, and the response B to the card reader 60 is performed. In this way, the card reader 60 can read information recorded on the non-contact IC card 50.

Thus, the non-contact IC card is convenient because the communication with the card reader is possible simply by holding the non-contact IC card over the card reader. On the other hand, however, since the recorded information can be read without contact, there is also a danger that unauthorized reading called skimming is performed without the bearer's knowledge to thereby have the information stolen.

In view of such circumstances, various attempts are made to prevent non-contact IC card skimming. For example, the inventor previously developed a card having a non-contact IC card skimming prevention function as described in the patent document 1. This card utilizes conductor properties, as shown in FIGS. 19(a) and 19(b). In detail, upon receiving the magnetic field A from the card reader 60, an eddy current is generated in a conductor 10 and a diamagnetic field that cancels out the magnetic field A from the card reader 60 is generated, as a result of which no response is performed from the non-contact IC card 50 to the card reader 60. Hence, the information recorded on the non-contact IC card cannot be read, so that skimming can be prevented.

Moreover, the patent document 2 describes an invention relating to a structure for preventing skimming of a card that carries an information recording medium such as a non-contact IC medium. The invention described in the patent document 2 is configured by laminating a plurality of members such as a fixed shielding member, a spacer member, a movable shielding member, and a laminate member, and includes a shielding unit and a read permission unit. In this invention, the movable shielding member is formed using a material that has a property of shielding, absorbing, or interfering with a communication wave such as an electric wave. Moving the movable shield member makes it possible to switch between a readable state and a non-readable state, and skimming can be prevented in the non-readable state.

Furthermore, the patent document 3 describes an invention relating to an unauthorized access prevention apparatus and an IC card holder that can protect card information from unauthorized access, by putting an IC card in a communicable state only when the card bearer wants to access and otherwise putting the IC card in a non-communicable state.

The invention described in the patent document 3 is configured by selectively short-circuiting or opening a conductive winding that is spirally wound in a plane. In the case where an IC card is placed so as to face the winding, when the winding is in a short-circuit state, an antenna portion of the IC card and the winding are magnetically coupled to each other, and a deviation occurs in antenna resonant frequency of the IC card. This inhibits IC card communication, so that unauthorized reading of recorded information is prevented. When the winding is in an open state, transmission/reception of card information is performed.

[Patent Document 1] Japanese Patent No. 3836496
[Patent Document 2] Japanese Patent Application Laid-Open No. 2007-199888
[Patent Document 3] Japanese Patent Application Laid-Open No. 2004-348500

DISCLOSURE OF THE INVENTION

Problems to be Solved by the Invention

According to the inventions described in the patent documents 1 and 2, skimming can be effectively prevented by bearing them together with a non-contact IC card. However, the structures according to these inventions are both manufactured by laminating a plurality of members, which requires many process steps and can result in increases in material cost.

The invention described in the patent document 3 is convenient in that it is possible to arbitrarily enable or disable reading of information recorded on a non-contact IC card. In order to induce a deviation in resonant frequency, however, the winding needs to be designed in consideration of the appropriate number of turns and an error during manufacturing for each non-contact IC card type, which causes a problem of increased manufacturing complexity. This is because a resonant frequency of a coil antenna built in a non-contact IC card differs depending on the type of non-contact IC card (for example, 13.56 MHz, 17 MHz, etc.), and also because under present circumstances there is an error of about ±0.5 MHz in coil antenna resonant frequency even when manufacturing non-contact IC cards of the same type.

In view of this, the present invention has an object of providing a non-contact IC card communication controller and a non-contact IC card holder that have a simplest possible structure and can be manufactured easily at low cost.

Means for Solving the Problems

To achieve the stated object, the present invention provides a non-contact IC card communication controller capable of selectively enabling or disabling reading of information recorded on a non-contact IC card that has a thickness of 0.8 mm or less and conforms to ISO 18092, the non-contact IC card communication controller including: a non-magnetic metal frame having a cut-off portion; and a non-magnetic metal piece for arbitrarily closing the cut-off portion, wherein, when placed so as to be overlaid with the non-contact IC card, the non-magnetic metal frame and a coil antenna built in the non-contact IC card are partially or entirely overlapped, and wherein, when a magnetic field of a strength of 7.5 A/m is applied to read the information recorded on the non-contact IC card, the reading of the information recorded on the non-contact IC card is enabled when the cut-off portion is in an open state, and the reading of the information recorded on the non-contact IC card is disabled when the cut-off portion is in a closed state.

Moreover, the present invention provides a non-contact IC card communication controller capable of selectively enabling or disabling reading of information recorded on a non-contact IC card that has a thickness of 0.8 mm or less and conforms to ISO 18092 or ISO 14443, the non-contact IC card communication controller including: a non-magnetic metal frame having a cut-off portion; and a non-magnetic metal piece for arbitrarily closing the cut-off portion, wherein the non-magnetic metal frame has a planar shape corresponding to a coil antenna built in the non-contact IC card, is wider than the coil antenna by 0.5 mm or more on both sides, and has a frame width of 21 mm or less from an outline toward a center of the non-contact IC card, wherein, when the non-magnetic metal frame is placed so as to be overlaid with the non-contact IC card, the coil antenna built in the non-contact IC card is positioned within the frame width of the non-magnetic metal frame, and wherein, when a magnetic field of a strength of 7.5 A/m is applied to read the information recorded on the non-contact IC card, the reading of the information recorded on the non-contact IC card is enabled when the cut-off portion is in an open state, and the reading of the information recorded on the non-contact IC card is disabled when the cut-off portion is in a closed state.

In these non-contact IC card communication controllers, the cut-off portion of the non-magnetic metal frame may be closed by sliding the non-magnetic metal piece. As an alternative, the non-magnetic metal piece may be placed above or below the cut-off portion of the non-magnetic metal frame in parallel with the non-magnetic metal frame, and the cut-off portion may be closed by pushing down or pushing up the non-magnetic metal piece.

Moreover, the present invention provides a non-contact IC card communication controller capable of selectively enabling or disabling reading of information recorded on a non-contact IC card that has a thickness of 0.8 mm or less and conforms to ISO 18092 or ISO 14443, the non-contact IC card communication controller including two square U-shaped non-magnetic metal segments, wherein the two non-magnetic metal segments are placed with square U-shaped openings thereof facing each other, the two non-magnetic metal segments being two independent non-magnetic metal segments in a first position, and integrally forming one non-magnetic metal frame in a second position, wherein, when the two non-magnetic metal segments are placed so as to be overlaid with the non-contact IC card, the two non-magnetic metal segments and a coil antenna built in the non-contact IC card are entirely overlapped, and wherein the reading of the information recorded on the non-contact IC card is enabled when the two non-magnetic metal segments are in the first position, and the reading of the information recorded on the non-contact IC card is disabled when the two non-magnetic metal segments are in the second position.

Furthermore, the present invention provides a non-contact IC card holder including any of the above-mentioned non-contact IC card communication controllers, wherein a non-contact IC card received in the card holder and the non-contact IC card communication controller come into surface contact with each other.

Advantageous Effect of the Invention

According to the present invention, the bearer can arbitrarily enable or disable communication of a non-contact IC card. Moreover, this can be realized using only non-magnetic metal, which contributes to simplified process steps and low manufacturing costs.

BRIEF DESCRIPTION OF THE DRAWINGS

FIG. 5 is a view showing a placement order when a non-contact IC card and the copper plate frame or the non-contact IC card communication controller according to the first embodiment of the present invention are placed on a card reader.

FIG. 6 is an experiment result showing a frame width and a communication enabled/disabled state in the case where the copper plate frame and the non-contact IC card are placed on the card reader in this order.

FIG. 14 is an experiment result showing a frame width, a communicable distance, and a communication success rate in the case of overlaying the non-contact IC card and the aluminum foil frame.

DESCRIPTION OF NUMERICAL REFERENCES

100: non-contact IC card communication controller
101: frame
20: cut-off portion
30a: piece

BEST MODE FOR CARRYING OUT THE INVENTION

The following describes preferred embodiments of the present invention with reference to drawings.

First Embodiment

Figure 1A:
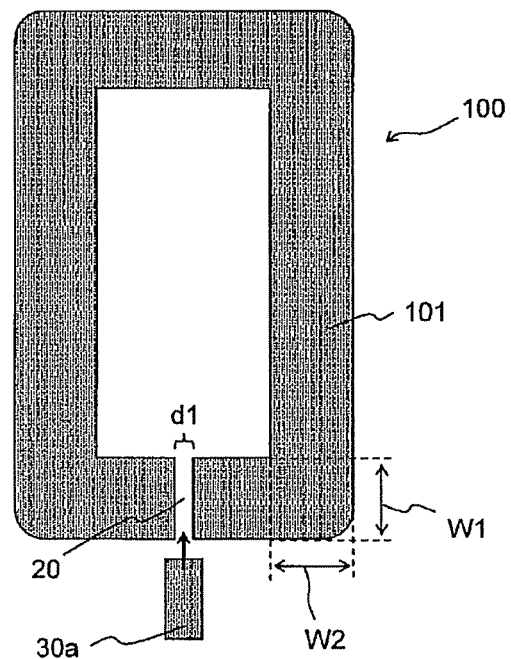
FIG. 1 is a schematic view showing a structure of a non-contact IC card communication controller according to a first embodiment of the present invention.
Figure 1B:
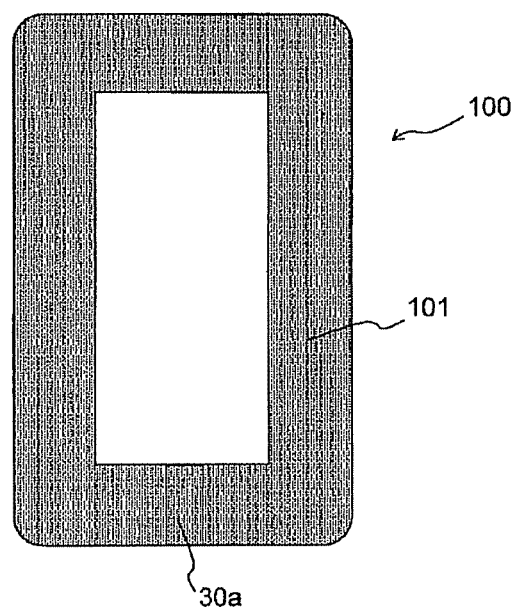

FIGS. 1(a) and 1(b) show a non-contact IC card communication controller according to a first embodiment of the present invention. A communication controller 100 has a frame shape made of copper foil of 35 μm in thickness, and is formed in a size of 86 mm×54 mm in correspondence with commonly used non-contact IC cards. Widths W1 and W2 of a frame 101 are equal to each other, and are in a range of 13 to 16 mm. A cut-off portion 20 is provided in a part of the frame 101. A width d1 of the cut-off portion 20 is, for example, about 2 mm.

The communication controller 100 further includes a piece 30a that is made of copper foil of 35 μm in thickness as with the frame 101. Though a size of the piece 30a is not specified, the piece 30a is sized so that, when slid in a horizontal direction and moved onto the frame 101, the piece 30a covers and closes the cut-off portion 20 so as to put the frame 101 in a state of not having the cut-off portion 20 as shown in FIG. 1(b).

Figure 2A:
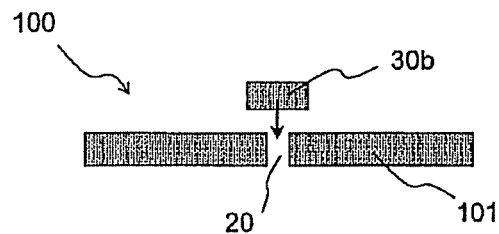
FIG. 2 is a schematic side view showing the structure of the non-contact IC card communication controller according to the first embodiment of the present invention.
Figure 2B:
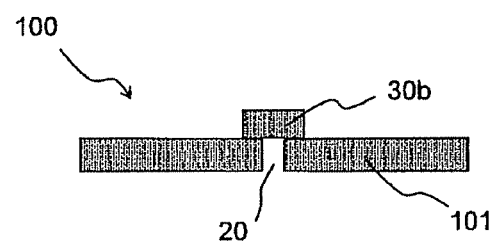

Here, a piece 30b that closes the cut-off portion 20 when placed above the cut-off portion 20 of the frame 101 and pushed down may be used as shown in FIGS. 2(a) and 2(b). Alternatively, the same piece 30b may be placed below the cut-off portion 20 and pushed up to close the cut-off portion 20 (not shown). Moreover, a spring or the like not shown may be disposed between the frame 101 and the piece 30b in order to clearly distinguish whether the cut-off portion 20 is open or closed.

Though copper foil is used in this embodiment, the frame 101 and the piece 30a or 30b are not limited to copper foil and may be made of other conductors. Note, however, that conductors which are less likely to generate an eddy current such as iron and stainless steel are not used, and the frame 101 and the piece 30a or 30b are formed using any of aluminum, gold, platinum, silver, and copper.

Upon developing the non-contact IC card communication controller 100 of the present invention having such a structure, the inventor intended the communication controller to be provided for RC-S853/854 (hereafter referred to as "first type" for convenience's sake) made by Sony Corporation and used for Suica (trademark) and ICOCA (trademark) and RC-S860 (hereafter referred to as "second type" for convenience's sake) made by Sony Corporation and used for QUICPay (trademark). These non-contact IC cards both have a thickness of 0.8 mm or less and conform to ISO 18092.

Figure 3A:
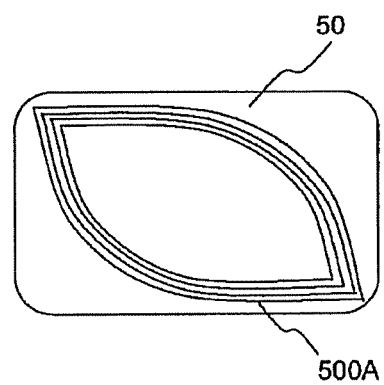
FIG. 3(a) is a schematic view of a coil antenna built in RC-S853/854 made by Sony Corporation.
Figure 3B:
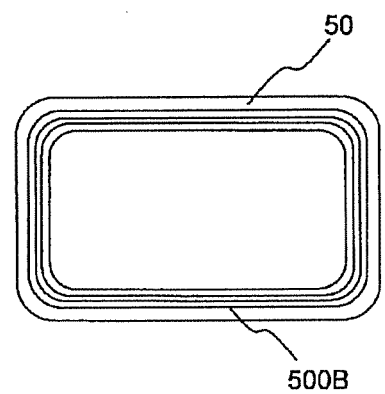
FIG. 3(b) is a schematic view of a coil antenna built in RC-S860 made by Sony Corporation.

As is well known, a coil 500A arranged in a leaf shape made up of circular arcs is built in the non-contact IC card of the first type, as shown in FIG. 3(a). On the other hand, a coil 500B arranged in a rectangle along card edges is built in the non-contact IC card of the second type, as shown in FIG. 3(b).

Figure 4:
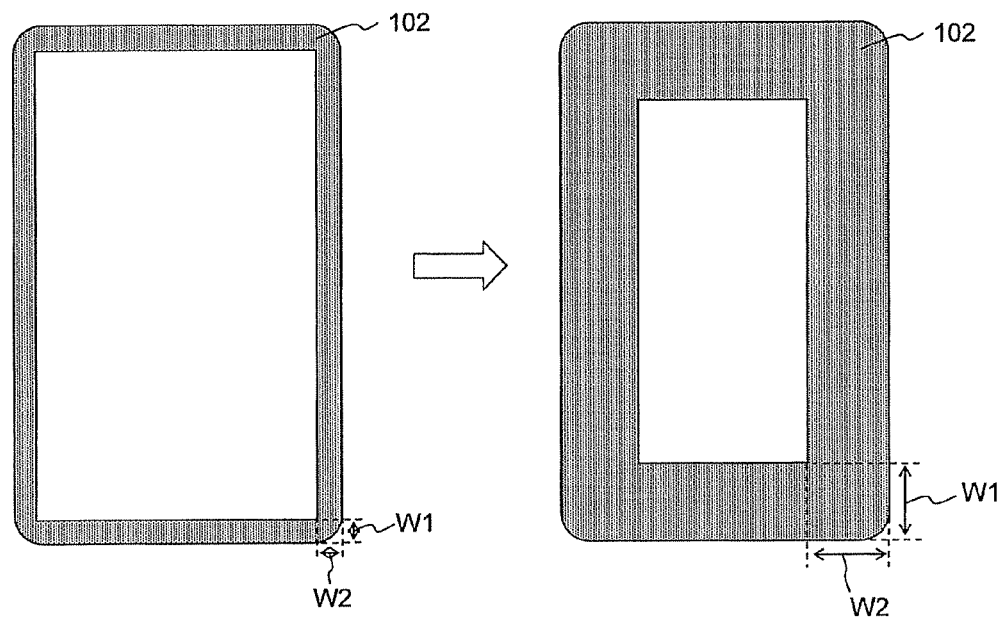
FIG. 4 is a schematic view explaining a copper plate frame used in an experiment.

This being so, a frame 102 that differs in frame width was made using copper foil as shown in FIG. 4, and this frame 102 was overlaid with a non-contact IC card to check a relationship between a frame width (that is, a degree of overlapping between the frame 102 and the coil) and a communication state of the non-contact IC card.

The frame 102 was formed using copper foil of 35 μm in thickness, with an outer shape of 86 mm×54 mm in correspondence with the non-contact IC card. Here, while increasing the frame widths W1 and W2 of the frame 102 from the outer edges toward the center by 1 mm starting at 3 mm, a magnetic field was applied from a card reader in a state of overlaying the frame 102 and the non-contact IC card, in order to find a frame width at which communication is disabled. Note that the frame widths W1 and W2 were set to be always equal to each other.

First, as shown in FIG. 5(a), the copper plate frame 102 and the non-contact IC card 50 were placed above the card reader 60 in this order, and whether the communication of the non-contact IC card 50 is enabled or disabled when applying a magnetic field of a magnetic field strength of 7.5 A/m and 10 A/m from the card reader 60 was checked. A result of this is shown in FIG. 6.

In detail, regarding the non-contact IC card of the first type, it was found that the non-contact IC card is not activated and no communication is performed in any of the cases where the magnetic field strength is 7.5 A/m and 10 A/m, when the width of the frame 102 becomes 11 mm or more. Regarding the non-contact IC card of the second type, on the other hand, it was found that the non-contact IC card is not activated and no communication is performed in any of the cases where the magnetic field strength is 7.5 A/m and 10 A/m, when the width of the frame 102 becomes 7 mm or more.

Figures 7, 8:
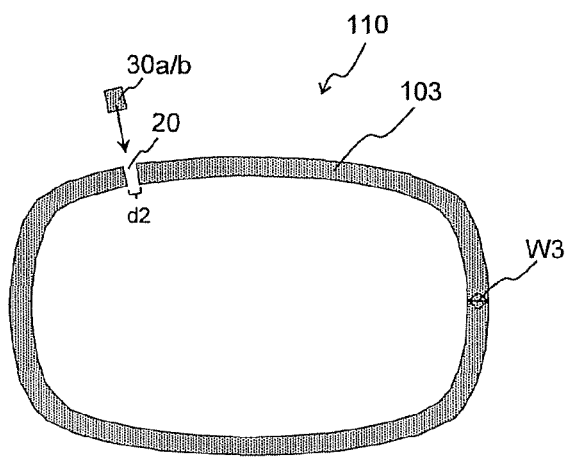
FIG. 7 is an experiment result showing a frame width and a communication enabled/disabled state in the case where the non-contact IC card and the copper plate frame are placed on the card reader in this order.
FIG. 8 is a schematic view showing a structure of a non-contact IC card communication controller according to a second embodiment of the present invention.

Next, as shown in FIG. 5(b), the non-contact IC card 50 and the copper plate frame 102 were placed above the card reader 60 in this order, and whether the communication of the non-contact IC card 50 is enabled or disabled when applying a magnetic field of a magnetic field strength of 7.5 A/m and 10 A/m from the card reader 60 was checked in the same way as the above-mentioned experiment. A result of this is shown in FIG. 7.

In detail, regarding the non-contact IC card of the first type, it was found that the non-contact IC card is not activated and no communication is performed in any of the cases where the magnetic field strength is 7.5 A/m and 10 A/m, when the width of the frame 102 becomes 13 mm or more. Regarding the non-contact IC card of the second type, on the other hand, it was found that the non-contact IC card is not activated and no communication is performed in any of the cases where the magnetic field strength is 7.5 A/m and 10 A/m, when the width of the frame 102 becomes 7 mm or more.

It is clear from the above-mentioned results that, by setting the frame width of the copper plate frame 102 to 13 mm or more, the communication can be prevented for the non-contact IC card of each of the first type and the second type because the IC is not activated when a magnetic field is applied from the card reader 60 to read information, regardless of the placement order of the non-contact IC card 50 and the copper plate frame 102 on the card reader 60.

However, this means that the non-contact IC card 50 needs to be separated from the copper plate frame 102 when the user wants to use the non-contact IC card 50, which significantly impairs the original convenience of the non-contact IC card.

Here, FIGS. 1 and 2 are referred to again. According to the above-mentioned experiments, when the frame width of the copper plate frame overlaid with the non-contact IC card is 13 mm or more, information recorded on the non-contact IC card cannot be read. In view of this, the communication controller 100 of the present invention has a structure in which a part of a magnetic path is interrupted by providing the cut-off portion 20 in a part of the frame 101 having such a frame width, thereby weakening an eddy current that is generated in the copper plate frame 101. As a result, a diamagnetic field that cancels out the magnetic field from the card reader is weakened, too. Accordingly, the communication of the non-contact IC card is enabled when the magnetic field is applied from the card reader.

On the other hand, when the user closes the cut-off portion 20 by moving the piece 30a or 30b, sufficiently strong eddy current is generated in the copper plate frame 101, so that a diamagnetic field strong enough to cancel out the magnetic field from the card reader is generated. As a result, the communication of the non-contact IC card is disabled.

As can be understood from the above-mentioned experiments, so long as the condition that the frame width is 13 mm or more is satisfied, whether or not the non-contact IC card can be read is unchanged depending on whether the communication controller 100 is placed closer to the card reader 60 (see FIG. 5(a)) or the non-contact IC card 50 is placed closer to the card reader 60 (see FIG. 5(b)).

Thus, according to the first embodiment of the present invention, it is possible to arbitrarily control the communicability of the non-contact IC card of each of the first type and the second type, by closing the cut-off portion 20 when the user wants to prevent skimming and opening the cut-off portion 20 when the user wants to have information read.

Second Embodiment

The following describes a second embodiment of the present invention.

FIG. 8 shows a non-contact IC card communication controller according to the second embodiment of the present invention. A communication controller 110 is made of aluminum foil, and formed in a frame shape corresponding to a coil antenna built in a non-contact IC card. A frame width W3 of a frame 103 is wholly constant, and the frame 103 is wider than the coil antenna by 0.5 mm or more on both sides. The cut-off portion 20 is provided in a part of the frame 103. A width d2 of the cut-off portion 20 is, for example, about 1 mm.

The communication controller 110 further includes the piece 30a or 30b made of aluminum foil. As in the first embodiment, the piece 30a or 30b covers and closes the cut-off portion 20 when slid, pushed down, or pushed up, to put the frame 103 in a state of not having the cut-off portion 20. Though aluminum foil is used for the frame 103 and the piece 30a or 30b in this embodiment, the frame 103 and the piece 30a or 30b are not limited to aluminum and may be formed using a non-magnetic metal such as gold, platinum, silver, or copper.

As mentioned earlier, the first embodiment was developed taking RC-S853/854 and RC-S860 made by Sony Corporation in conformity with ISO 18092 into consideration. However, other non-contact IC cards called "type A" and "type B" in conformity with ISO 14443 are also widely used.

Figure 9A:
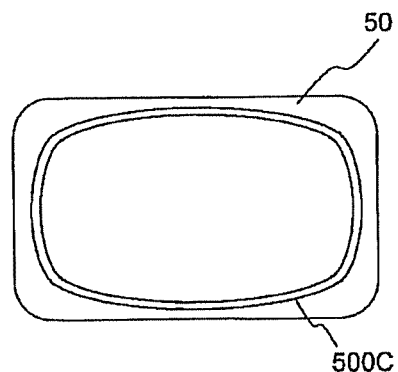
FIG. 9(a) is a schematic view of a coil antenna built in a non-contact IC card of type A in conformity with ISO 14443.
Figure 9B:
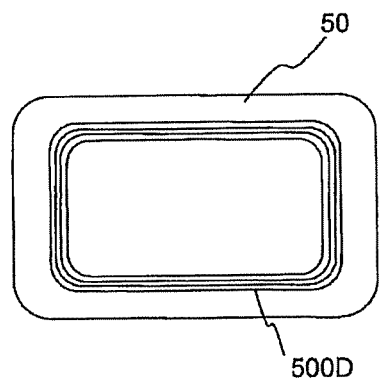
FIG. 9(b) is a schematic view of a coil antenna built in a non-contact IC card of type B in conformity with ISO 14443.

In Japan, the non-contact IC card of type A is adopted, for example, in adult identification cards for purchasing tobacco products. As shown in FIG. 9(a), the non-contact IC card of type A includes a coil antenna 500C having an approximately rectangular shape. Meanwhile, the non-contact IC card of type B is adopted, for example, in driver's licenses. As shown in FIG. 9(b), the non-contact IC card of type B includes a coil antenna 500D shaped in a rectangle near the center of the card.

In view of such coil antenna shapes, upon developing the non-contact IC card communication controller 110, a frame corresponding to the coil antenna shape of each of the non-contact IC cards of type A and type B as well as the above-mentioned first type and second type (also collectively referred to as type C) was made and a communication state was checked. Note that the non-contact IC cards of type A and type B are assumed to have a thickness of 0.8 mm or less, as with the first type and the second type.

Figure 10A:
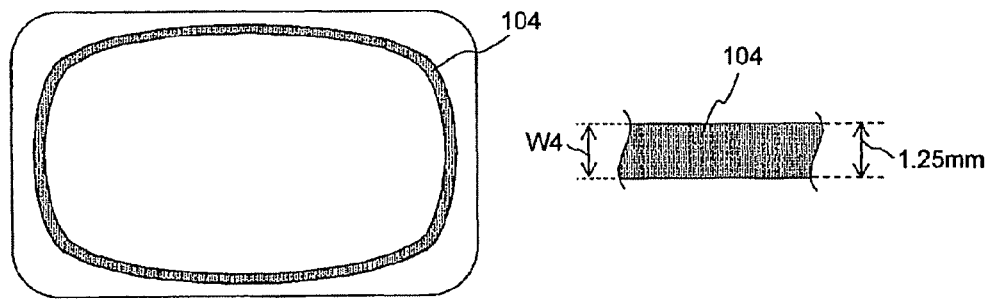
FIGS. 10(a), 10(b), and 10(c) are schematic views explaining an aluminum foil frame used in an experiment.
Figure 10B:
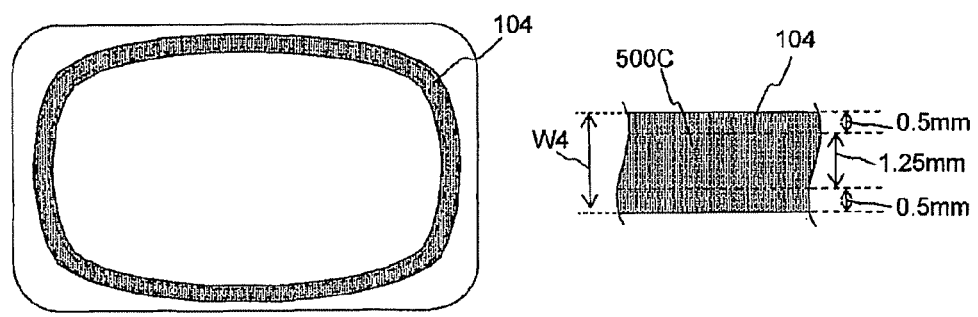
Figure 10C:
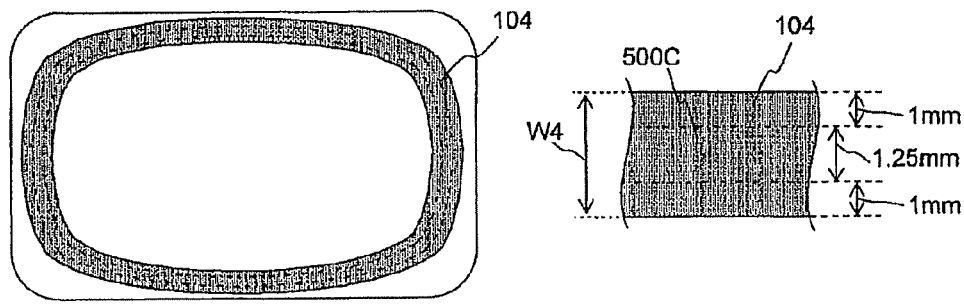

FIGS. 10(a) to 10(c) show a frame 104 made in correspondence with the shape of the coil antenna built in the non-contact IC card of type A. In each of the drawings, an overall view is shown on the left, and an enlarged partial view is shown on the right. The frame 104 was made of aluminum foil of 12 μm in thickness. A width W4 of the frame 104 is a width equal to a coil antenna width (about 1.25 mm) in FIG. 10(a), a width (0.5 mm+1.25 mm+0.5 mm=2.25 mm) increased by 0.5 mm on both sides of the coil antenna in FIG. 10(b), and a width (1 mm+1.25 mm+1 mm=3.25 mm) increased by 1 mm on both sides of the coil antenna in FIG. 10(C). In the same manner, an aluminum foil frame that differs in frame width was made in correspondence with the coil antenna shape of each of the non-contact IC cards of type B, the first type, and the second type (not shown).

Figures 11, 12:
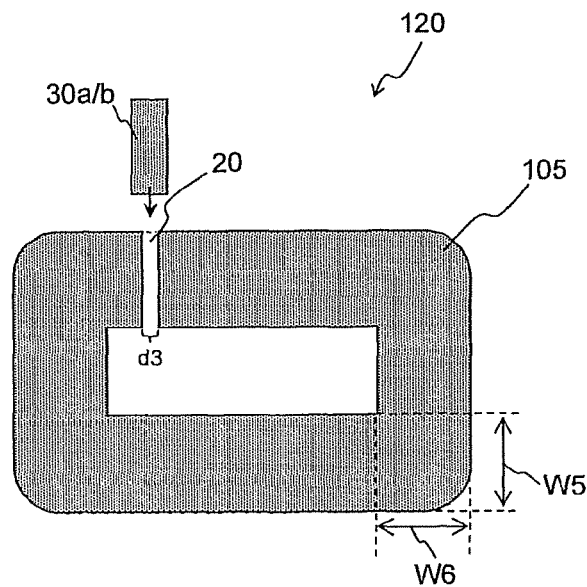
FIG. 11 is an experiment result showing a frame width and a communication enabled/disabled state in the case where the non-contact IC card and the aluminum foil frame are placed on the card reader in this order.
FIG. 12 is a schematic view showing a structure of a non-contact IC card communication controller according to a third embodiment of the present invention.

Having disposed the frame 104 on the non-contact IC card at the coil antenna position, the card reader 60, the non-contact IC card 50, and the frame 104 were placed in this order as shown in FIG. 5(b), and whether the communication between the card reader 60 and the non-contact IC card 50 is enabled or disabled was checked. A magnetic field strength applied from the card reader 60 was set to 7.5 A/m. A result of this is shown in FIG. 11.

As shown in the drawing, the non-contact IC card of type A is not activated in the case where the width W4 of the frame 104 is larger than the coil antenna width by 0.5 mm or 1 mm on both sides. However, the non-contact IC card of type A is activated and communication is performed in the case where the width W4 is equal to the coil antenna width. On the other hand, the non-contact IC cards of type B, the first type, and the second type are not activated and no communication is performed in any of the three patterns of the width W4 of the frame 104.

This demonstrates that, for each of the non-contact IC cards of type A, type B, the first type, and the second type, the communication between the non-contact IC card and the card reader can be prevented so long as the frame 104 is wider than the coil antenna by 0.5 mm or more on both sides.

On the basis of this result, the communication controller 110 shown in FIG. 8 has a structure in which a part of a magnetic path is interrupted by providing the cut-off portion 20 in a part of the aluminum foil frame 103 whose frame width W3 is larger than the coil antenna width by 0.5 mm or more on both sides, thereby weakening an eddy current that is generated in the frame 103. By placing the frame 103 so as to overlap the coil antenna built in the non-contact IC card, when the cut-off portion 20 is in an open state, a diamagnetic field that cancels out the magnetic field from the card reader is also weakened, so that the communication of the non-contact IC card is enabled. When the cut-off portion 20 is closed by the piece 30a or 30b, sufficiently strong eddy current is generated in the frame 103, as a result of which a strong diamagnetic field is generated and cancels out the magnetic field from the card reader. Thus, the use of the communication controller 110 makes it possible to disable the communication of all types of non-contact IC cards including the first type, the second type, type A, and type B.

Third Embodiment

The following describes a third embodiment of the present invention.

FIG. 12 shows a non-contact IC card communication controller according to the third embodiment of the present invention. A communication controller 120 is made of aluminum foil, and formed in a frame shape having the same outer shape of 86 mm×54 mm as the non-contact IC card. Frame widths W5 and W6 of a frame 105 are always equal to each other, and are set to 21 mm or less from the outer edges of the frame 105. The cut-off portion 20 is provided in a part of the frame 105. A width d3 of the cut-off portion 20 is, for example, about 1 mm.

The communication controller 120 further includes the piece 30a or 30b made of aluminum foil. As in the first and second embodiments, the piece 30a or 30b covers and closes the cut-off portion 20 when slid, pushed down, or pushed up, to put the frame 105 in a state of not having the cut-off portion 20. The frame 105 and the piece 30a or 30b are not limited to aluminum and may be formed using a non-magnetic metal such as gold, platinum, silver, or copper, as in the second embodiment.

This non-contact IC card communication controller 120 is intended to switch the communication with the card reader between an enabled state and a disabled state, for all of the non-contact IC cards of the first type, the second type, type A, and type B. Accordingly, a frame having the same outer shape as the non-contact IC card was made while changing its frame width, and a communication state when overlaying this frame and the non-contact IC card was checked.

Figure 13A:
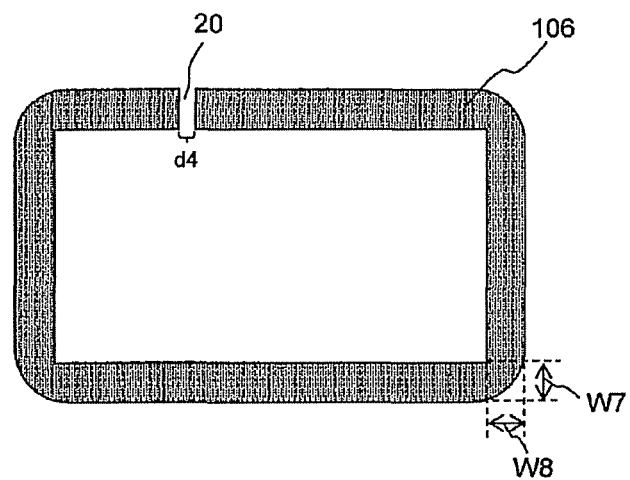
FIGS. 13(a) and 13(b) are schematic views explaining an aluminum foil frame used in an experiment.
Figure 13B:
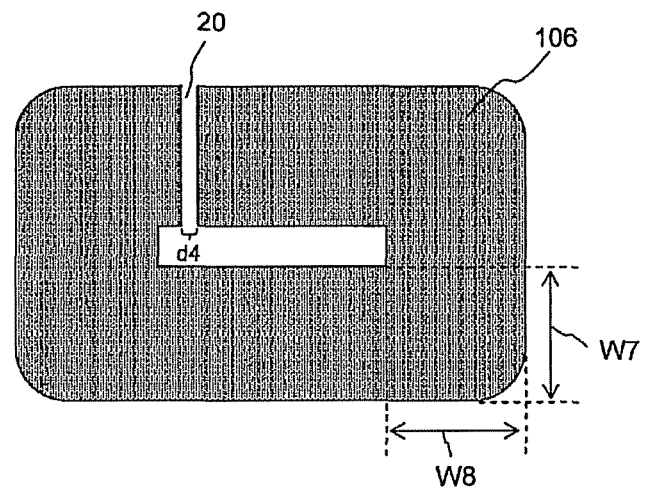

FIGS. 13(a) and 13(b) show a frame 106 made of aluminum foil of 12 μm in thickness. The frame 106 has the cut-off portion 20 whose width d4 is 1 mm. Widths W7 and W8 of the frame 106 are always equal to each other, and are changed by 1 mm from 10 mm up to 25 mm. Having aligned the outer shapes of the frame 106 and the non-contact IC card, the card reader 60, the non-contact IC card 50, and the frame 106 were placed in this order as shown in FIG. 5(b) and, for each frame width, a distance between the non-contact IC card 50 and the card reader 60 at which the communication between the card reader 60 and the non-contact IC card 50 becomes possible was checked. Here, a magnetic field strength applied from the card reader 60 was set to 7.5 A/m. A result of this is shown in FIG. 14.

In FIG. 14, "communication success rate" indicates a probability that the communication is enabled at the distance where the non-contact IC card becomes communicable when the non-contact IC card and the frame 106 are held together over the card reader, with the communication success rate in the case of using only the non-contact IC card being set to 100%. It is desirable that this value reaches at least 50%. From the result shown in FIG. 14, it can be understood that the frame widths W7 and W8 of the frame 106 which achieve the communication success rate of 50% or more for all of the four types of non-contact IC cards are 21 mm or less.

Therefore, the frame widths W5 and W6 of the frame 105 in the non-contact IC card communication controller 120 are set in accordance with this. Note here that the whole coil antenna built in the non-contact IC card needs to be placed so as to be overlapped with the frame 105.

<Modification>

The communication controllers 100, 110, and 120 described in the first to third embodiments can be realized even when the frames 101, 103, and 105 have other structures. For example, two square U-shaped non-magnetic metals may be placed with their openings facing each other, so that the communication between the non-contact IC card and the card reader is enabled or disabled depending on whether their open ends are separated from or connected to each other. In this case, the piece for closing the cut-off portion is unnecessary.

Fourth Embodiment

Figure 15:
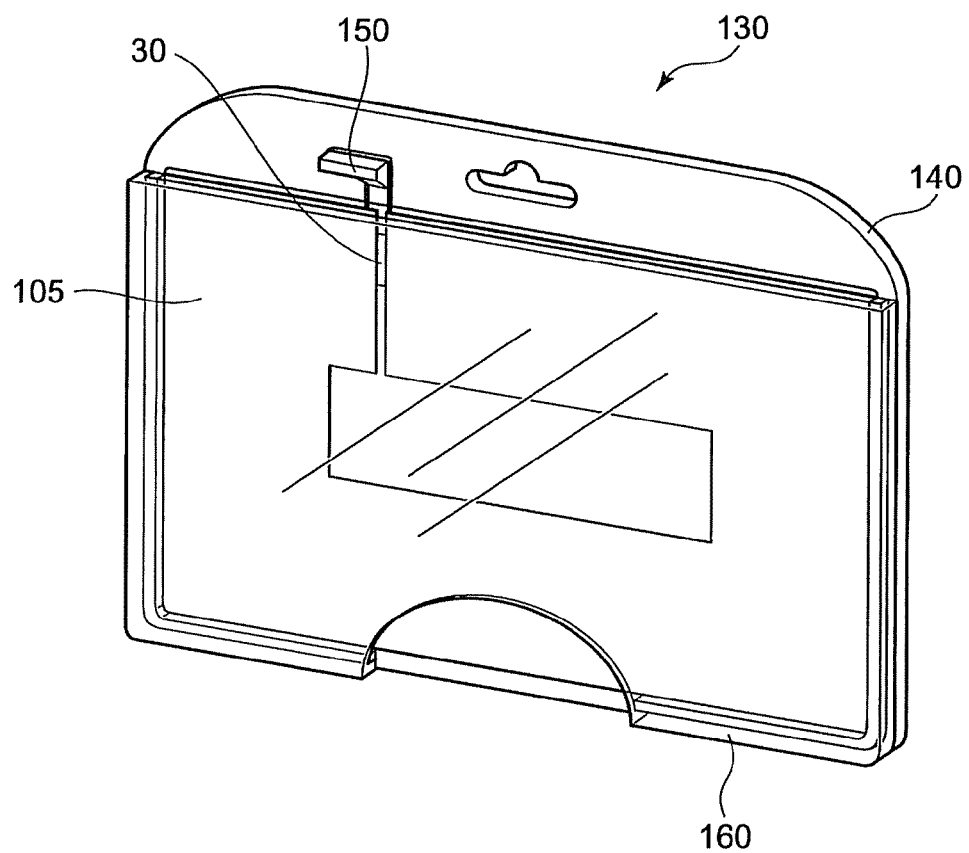
FIG. 15 is a perspective view of a non-contact IC card holder according to a fourth embodiment of the present invention.

As a fourth embodiment of the present invention, a card holder such as the one shown in FIG. 15 can be made by using the non-contact IC card communication controller of the present invention described above.

A card holder 130 is configured by combining a back plate 140 and a front plate 160 so as to form a pocket in which one non-contact IC card of any of the above-mentioned four types can be inserted. The front plate 160 is made transparent to allow the inserted non-contact IC card to be easily visible. This is useful, for example, in the case where the non-contact IC card is an employee ID card with a photograph. Moreover, the card can be easily inserted and removed by providing a slit, such as the one shown in the drawing, at the bottom of the front plate 160.

Any of the non-contact IC card communication controllers 100, 110, and 120 described above is incorporated inside the pocket. In the card holder 130 shown in FIG. 15, the non-contact IC card communication controller 120 is incorporated inside the pocket, with the frame 105 being bonded to the back plate 140. A piece 30 is disposed so as to be switched between a contact state and a non-contact state with the frame 105 by an operation of a switch portion 150 formed integrally with the back plate 140.

Figure 16:
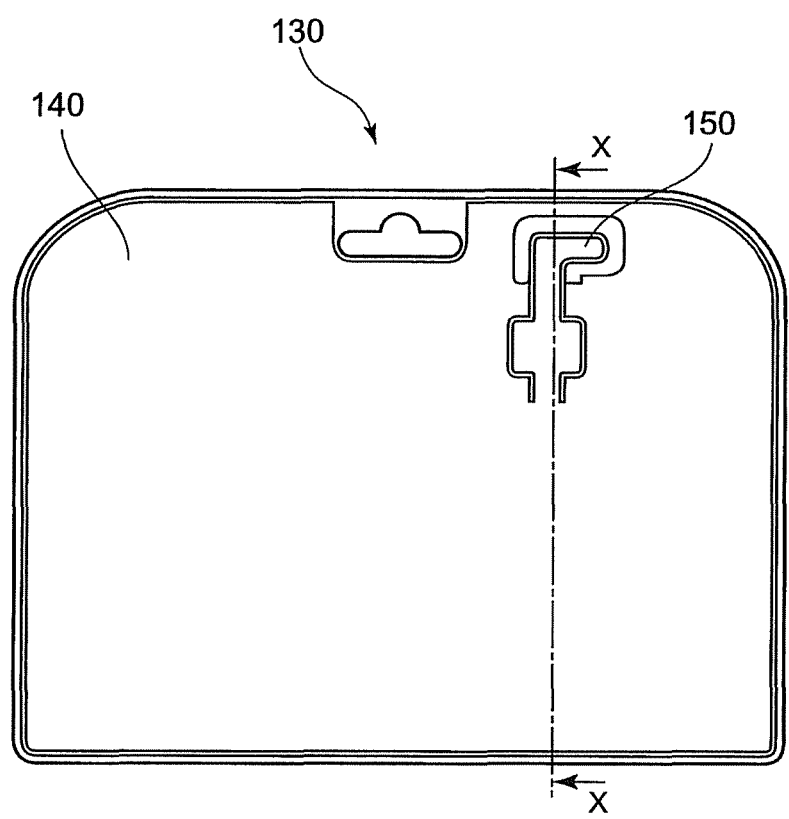
FIG. 16 is a back view of the non-contact IC card holder according to the fourth embodiment of the present invention.

FIG. 16 is a back view of the card holder 130. As shown in the drawing, the back plate 140 is cut along an outline of the switch portion 150, and the switch portion 150 is connected to the back plate 140 only at its base. The back plate 140 and the switch portion 150 are made of a material that has a certain degree of elasticity such as a resin.

Figure 17A:
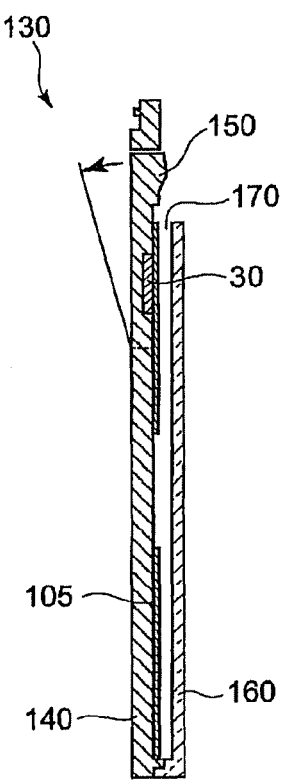
FIG. 17 is a sectional view of the non-contact IC card holder according to the fourth embodiment of the present invention.
Figure 17B:
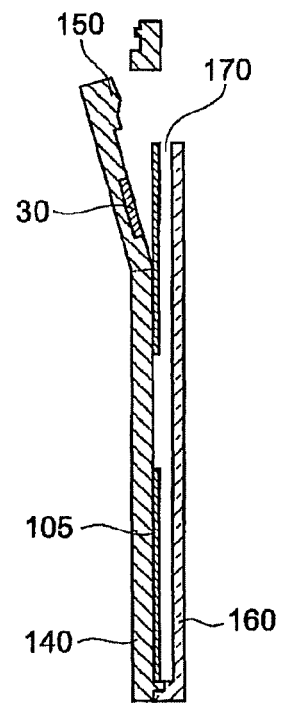
Figure 18A:
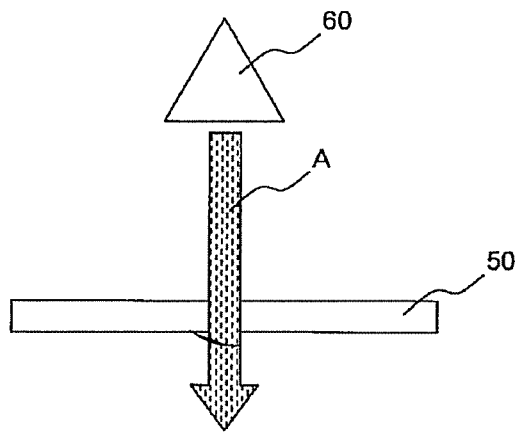
FIG. 18 is a view explaining a communication operation between a non-contact IC card and a card reader.
Figure 18B:
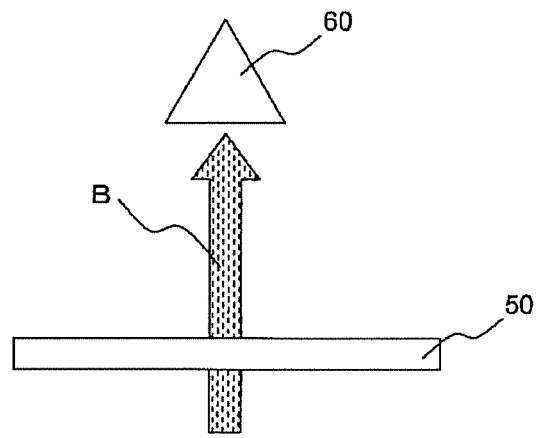
Figure 19A:
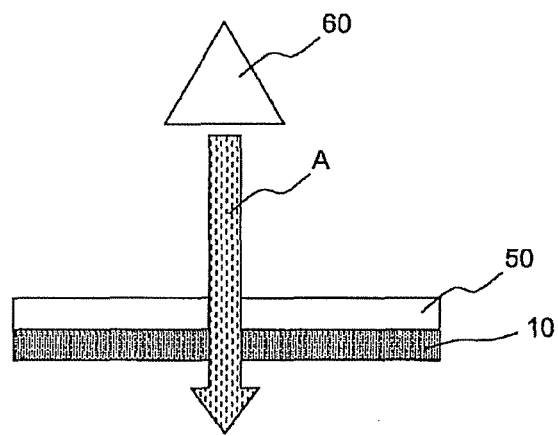
FIG. 19 is a view explaining communication between a non-contact IC card and a card reader in the case of using a structure having a skimming prevention design.
Figure 19B:
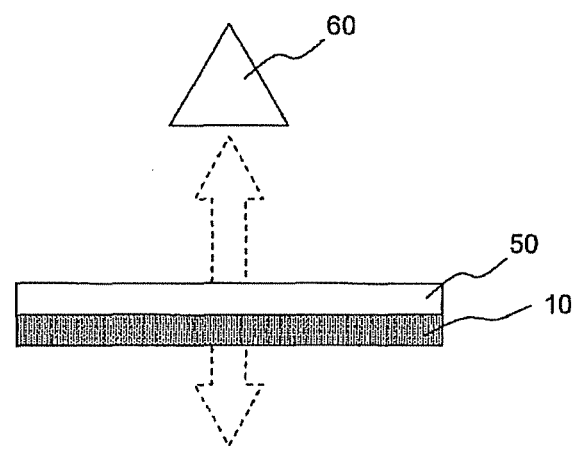

FIGS. 17(a) and 17(b) are sectional views taken along line X-X in FIG. 16. FIG. 17(a) shows a normal state where the switch 150 is not pressed. In this case, the piece 30 is in contact with the frame 105, so that the cut-off portion of the frame 105 is closed. Therefore, the non-contact IC card received in the pocket 170 is not activated even when a magnetic field is applied from the card reader.

On the other hand, FIG. 17(b) shows a state where the switch 150 is pressed. In this case, the piece 30 is separated from the frame 105, so that the cut-off portion of the frame 105 is open. Therefore, the non-contact IC card received in the pocket 170 is activated upon receiving a magnetic field from the card reader, and communication is performed. When the switch 150 is released, the switch 150 returns to the original position by its elasticity. As a result, the card holder 130 is put in the state shown in FIG. 17(a) again, thereby disabling the activation of the non-contact IC card.

The card holder 130 can be dangled from the user's neck by a cord that is passed through a hole at the upper center. As an example, when holding the non-contact IC card over the card reader installed on the wall, the user performs this operation by carrying the holder portion with his/her right hand. For this, it is preferable to position the switch 150 so that the user can easily press the switch 150 when carrying the holder portion with his/her right hand.

Though the embodiments of the present invention have been described above, the present invention is not limited to these embodiments, as various other embodiments are possible within the scope of the claims.

In each embodiment, the magnetic field strength from the card reader is set to 7.5 A/m. Given that the magnetic field strength generated by this type of card reader is typically in a range of about 4.5 A/m to 10 A/m, an intermediate value is taken as a representative magnetic field strength. Moreover, the cut-off portion may be provided at any position of the frame. For instance, the cut-off portion may be provided at a position overlapping an IC chip built in the non-contact IC card.

The shape and the frame width of the non-magnetic metal frame in each embodiment are designed based on differences in shapes of the coil antennas and power consumptions of the IC chips built in the different types of non-contact IC cards. In each embodiment, it is desirable that the thickness of the card is 0.8 mm or less and the gap between the non-contact IC card and the communication controller is 0.2 mm or less, regardless of the type of non-contact IC card.

INDUSTRIAL APPLICABILITY

By manufacturing a card holder of a form in which two card holders according to the fourth embodiment of the present invention are bonded together on their back surfaces with a magnetic body interposed in between, it is possible to obtain a card holder that can receive two non-contact IC cards and arbitrarily enable the activation of a desired one of the non-contact IC cards.

The invention claimed is:

1. A non-contact IC card communication controller capable of selectively enabling or disabling reading of information recorded on a non-contact IC card that has a thickness of 0.8 mm or less and conforms to ISO 18092, the non-contact IC card communication controller comprising:
   a non-magnetic hollow metal frame having one cut-off portion sized 1-2 mm in width and 3-25 mm in length; and
   a non-magnetic metal piece positioned adjacent to the cut-off portion for repeatedly closing the cut-off portion so as to weaken and strengthen an eddy current that is generated in the non-magnetic hollow metal frame,
   wherein, the controller overlays the non-contact IC card such that the non-magnetic hollow metal frame and a coil antenna built in the non-contact IC card are overlapped so as to substantially conceal the coil antenna regardless of the cut-off portion being opened or closed, and
   wherein, when a magnetic field of a strength of 7.5 A/m is applied to read the information recorded on the non-contact IC card, the controller disables reading of information recorded on the non-contact IC card when the cut-off portion is closed by the non-magnetic metal piece, and the controller enables reading of information recorded on the non-contact IC card when the cut-off stays open.

2. The non-contact ID card communication controller as claimed in claim 1, wherein the cut-off portion of the non-magnetic metal frame is closed by sliding the non-magnetic metal piece.

3. The non-contact IC card communication controller as claimed in claim 1,
   wherein the non-magnetic metal piece is placed above or below the cut-off portion of the non-magnetic metal frame in parallel with the non-magnetic frame, and
   wherein the cut-off portion is closed by pushing down or pushing up on the non-magnetic metal piece.

4. The non-contact IC card communication controller as claimed in claim 1, wherein the non-magnetic metal is any of aluminum, gold, platinum, silver, and copper.

5. A non-contact IC card holder comprising the non-contact IC card controller as claimed in claim 1, wherein a non-contact IC card received in the card holder and the non-contact IC card communication controller come into surface contact with each other.

6. A non-contact IC card communication controller capable of selectively enabling or disabling reading of information recorded on a non-contact IC card that has a thickness of 0.8 mm or less and conforms to ISO 18092 or ISO 14443, the non-contact IC card communication controller comprising:
   a non-magnetic hollow metal frame having one cut-off portion sized 1-2 mm in width and 3-25 mm in length; and
   a non-magnetic metal piece positioned adjacent to the cut-off portion for repeatedly closing the cut-off portion so as to weaken and strengthen an eddy current that is generated in the non-magnetic hollow metal frame,
   wherein the non-magnetic hollow metal frame has a planar shape corresponding to a coil antenna built in the non-contact IC card, is wider than the coil antenna by 0.5 mm or more on both sides, and has a frame width of 21 mm or less from an outline toward a center of the non-contact IC card,
   wherein, the controller overlays the non-contact IC card such that the coil antenna built in the non-contact IC card is positioned within the frame width of the non-magnetic hollow metal frame, so as to substantially conceal the coil antenna regardless of the cut-off portion being opened or closed, and
   wherein, when a magnetic field strength of 7.5 A/m is applied to read the information recorded on the non-contact IC card, the controller disables reading of information recorded on the non-contact IC card when the cut-off portion is closed by the non-magnetic metal piece, and the controller enables reading of information recorded on the non-contact IC card when the cut-off portion stays open.

* * * * *